United States Patent
Dong et al.

(10) Patent No.: US 8,132,559 B2
(45) Date of Patent: Mar. 13, 2012

(54) WATER/AIR SEPARATOR

(75) Inventors: Mike Dong, Ann Arbor, MI (US); Syed K Ali, Dearborn, MI (US); Mohammad Usman, Northville, MI (US); Charles Frank Bartus, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 12/837,002

(22) Filed: Jul. 15, 2010

(65) Prior Publication Data

US 2012/0012080 A1    Jan. 19, 2012

(51) Int. Cl.
*F02M 33/02* (2006.01)
*F02M 33/00* (2006.01)

(52) U.S. Cl. ........................................ 123/519

(58) Field of Classification Search ............... 123/519, 123/198 E; 55/337, 396
See application file for complete search history.

(56) References Cited

U.S. PATENT DOCUMENTS

| | | | |
|---|---|---|---|
| 2,872,043 A * | 2/1959 | Fitzgerald et al. | 210/307 |
| 3,339,350 A * | 9/1967 | Sims | 55/320 |
| 4,365,980 A * | 12/1982 | Culbert et al. | 55/315 |
| 4,626,348 A * | 12/1986 | Stone | 210/248 |
| 5,912,368 A | 6/1999 | Satarino et al. | |
| 5,989,318 A * | 11/1999 | Schroll | 96/6 |
| 5,997,739 A * | 12/1999 | Clausen et al. | 210/232 |
| 6,161,526 A | 12/2000 | Sakata et al. | |
| 6,390,073 B1 | 5/2002 | Meiller et al. | |
| 7,343,904 B2 * | 3/2008 | Jo | 123/519 |
| 7,547,350 B2 | 6/2009 | Callahan et al. | |
| 7,645,329 B2 | 1/2010 | Niakan et al. | |
| 7,665,428 B2 | 2/2010 | Dearth et al. | |
| 7,674,377 B2 | 3/2010 | Carew | |
| 7,857,879 B2 * | 12/2010 | Egger | 55/337 |
| 2008/0110140 A1 * | 5/2008 | Egger | 55/337 |
| 2008/0223343 A1 | 9/2008 | Ammermann | |

* cited by examiner

*Primary Examiner* — Mahmoud Gimie (57) ABSTRACT

A filter assembly having: an air filter; an air filter compartment having the air filter disposed therein; and a cap covering the air filter compartment. The cap has ribs disposed along inner sidewalls of the cap. The ribs, outer sidewalls of the compartment, and inner sidewalls of the cap form a plurality of channels having inlets for receiving a mixture of air and water. The walls of the channels collect droplets of a water portion of the mixture entering the channels. The collected water portion is removed from the filter assembly by gravity. The air filter compartment receives the air portion of the mixture exiting outlets of the channels. The exiting air portion received by the compartment passes through the air filter and after passing through the air filter passes out of the filter assembly.

15 Claims, 11 Drawing Sheets

WATER/AIR SEPARATOR

TECHNICAL FIELD

This disclosure relates generally to water/air separators and more particularly to water/air separators used in internal combustion engines.

BACKGROUND

As is known in the art, in modern automotive engine evaporation (EVAP) emission control systems, a carbon canister is required to adsorb and store fuel vapor to avoid atmospheric pollution. The canister operation involves two major modes—a loading mode and a purging mode. During the purging mode, fresh air enters the carbon canister to clean up the fuel vapor stored in it. In order to prevent dust contaminants entering the canister, an air filter is required at the entrance to the fresh air intake port. To detect EVAP leakage a diaphragm type natural vacuum leak detection (NVLD) device is installed in the EVAP system and is located between the air filter and the carbon canister. In order to protect the NVLD from the dust and water, a fine air filter is used. For such fine filter, exposure to water may reduce its performance and may even damage it.

SUMMARY

In accordance with the disclosure, a water/air separation method and device are provided having at least one elongated channel for passing a mixture of air and water with the walls of the channel collecting droplets of the water and wherein the collected water is removed by gravity.

In one embodiment, an EVAP filter is provided a cap covering an air filter compartment entrance grille. Flow channels in the cap separate the water from an air/water mixture flowing towards the EVAP filter and guide the air portion of the mixture to enter the air filter compartment while inner walls of the channels collect the water portion of the mixture with such collected portion of the water exiting the cap under gravity In one embodiment, a water/air separator is provided, comprising: at least one elongated channel for passing a mixture of air and water with the walls of the channel collecting droplets of the water and wherein the collected water is removed by gravity.

In one embodiment, the separator includes an inner compartment for receiving an air portion of the mixture from at least one elongated channel and wherein the inner compartment has an output for removing the air portion of the mixture from the separator.

In one embodiment, the inner compartment has an air filter therein positioned to receive the air portion received by the compartment to filter the received air portion and wherein the outlet receives the filtered air portion of the mixture.

In one embodiment, an outer portion of the inner compartment provides an inner wall portion of the at least one channel.

In one embodiment, a filter assembly comprises: an air filter; an air filter compartment having the air filter disposed therein; and a cap covering the air filter compartment. The cap has ribs disposed along inner sidewalls of the cap. The ribs, outer sidewalls of the compartment, and inner sidewalls of the cap form a plurality of channels having inlets for receiving a mixture of air and water. The walls of the channels collect droplets of a water portion of the mixture entering the channels. The collected water portion is removed from the filter assembly by gravity. The air filter compartment receives the air portion of the mixture exiting outlets of the channels, such exiting air portion received by the compartment passing through the air filter, and after passing through the air filter, passing out of the filter assembly.

In one embodiment, the compartment includes an entrance grill for receiving the air portion of the mixture from the outlets of the channels and wherein the cap has a resilient snap member projecting outwardly therefrom and wherein the grill has a portion thereof formed to receive the snap member to enable the cap to be snapped to the grill.

In one embodiment, the cap has a hole for passing the water portion of the mixture being removed by gravity.

In one embodiment, the ribs are formed to provide the channels with a shape to provide a swirl-like stream to the mixture entering the channels.

In one embodiment, the ribs are formed to provide the channels with a shape to provide a spiral-like stream to the mixture entering the channels.

In one embodiment, a filter assembly comprises: an air filter; an air filter compartment having the air filter disposed therein; and a cap covering the air filter compartment, such cap having ribs disposed along inner sidewalls of the cap, such ribs, outer sidewalls of the compartment, and inner sidewalls of the cap forming a plurality of channels having inlets for receiving a mixture of air and water, with the walls of the channels collecting droplets of a water portion of the mixture entering the channels and wherein the collected water portion is removed from the filter assembly by gravity and wherein the air filter compartment has holes in the outer sidewalls for receiving the air portion of the mixture exiting outlets of the channels, such exiting air portion received by the compartment passing through the air filter, and after passing through the air filter, passing out of the filter assembly.

In one embodiment, a method is provided for separating water and air from an air/water mixture, comprising: passing the mixture to an inlet of at least one elongated channel; collecting droplets of the water on inner walls of the at least one channel; and removing the collected water from the at least one channel by gravity.

In one embodiment, a center tube has holes in the outer sidewalls for receiving the air portion of the mixture exiting outlets of the channels, such exiting air portion passes out of the center tube.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIG. 2A' is a diagram showing the filter assembly according to another embodiment of the disclosure;

Like reference symbols in the various drawings indicate like elements.

DETAILED DESCRIPTION

Figure 1:
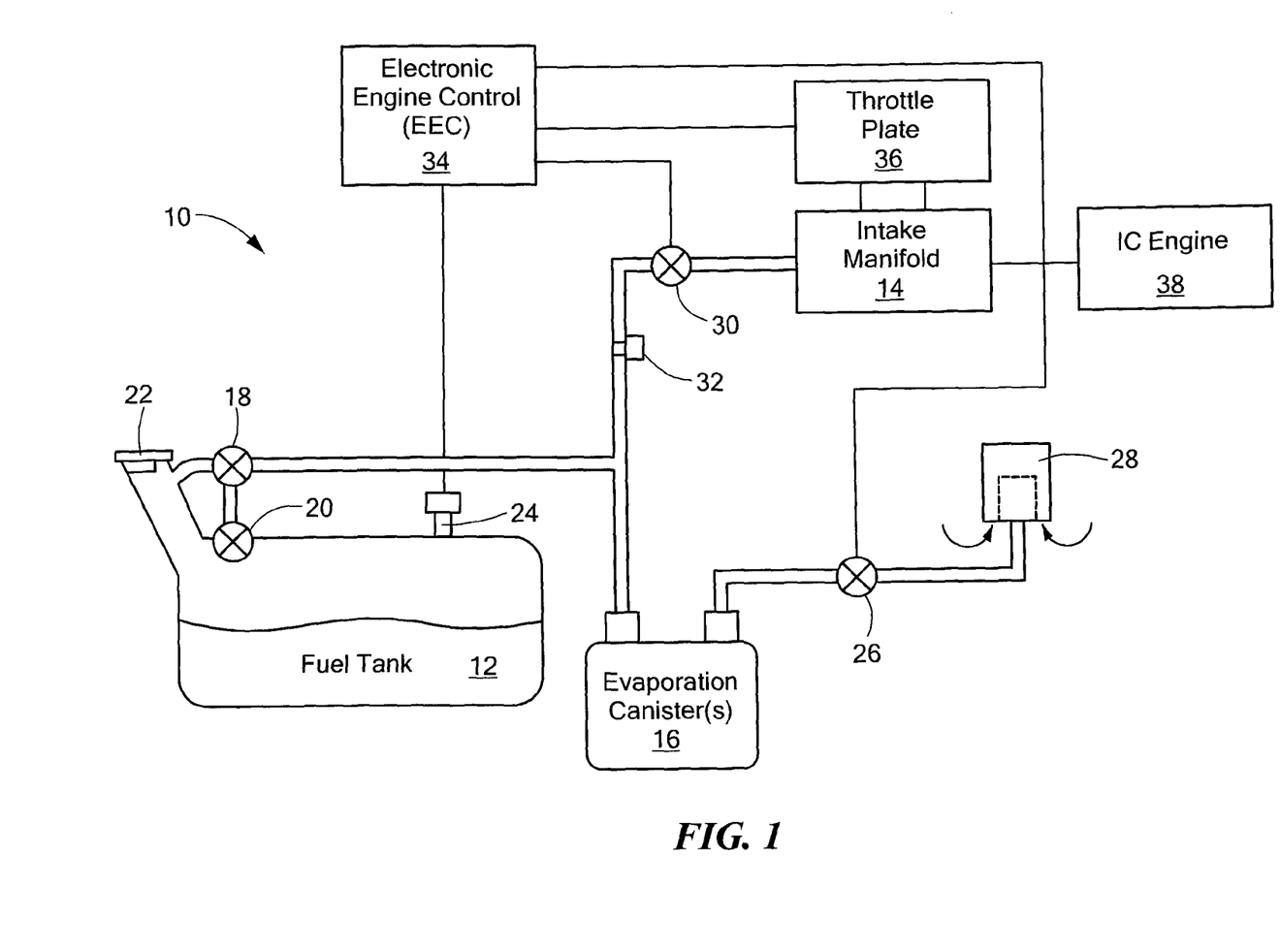
FIG. 1 is a diagrammatical sketch of a vehicle fuel delivery system to the engine having a filter assembly according to the disclosure.

Referring first to FIG. 1, a vehicle is equipped with an evaporative (fuel vapor) emission control system, generally indicated by the numeral 10. An emission control system 10 includes a fuel tank 12 having its upper internal volume in communication with one or more evaporative canisters 16 and the intake manifold 14 of an internal combustion engine (ICE) 38. The fuel tank 12 provides fuel to the engine 38 and typically includes a vapor vent valve 18 as well as a rollover valve 20. The fuel tank 12 may also include a vacuum relief valve 22, integral with the fuel tank cap, for preventing excessive vacuum or pressure from being applied to the fuel tank 12. The fuel tank 12 further includes a pressure transducer 24 for monitoring fuel tank pressure or vacuum and for providing a corresponding input signal to the electronic engine control (EEC) 34. The pressure transducer 24 may be installed directly into the fuel tank 12 or remotely mounted and connected by a line to the fuel tank 12.

Evaporation storage canister 16 is provided for trapping and subsequently using fuel vapor dispelled from the fuel tank 12. The evaporation canister 16 is connected to the atmosphere (ATM) through a canister vent valve (CVV) or a natural vacuum leak detection (NVLD) device 26. A filter assembly 28, to be described in more detail below, here an EVAP filter having a water/air separator, is provided between the CVV or NVLD 26 and the atmosphere having a mixture of air and water (i.e., an air/water mixture) for filtering the air portion of the mixture pulled into the assembly 28 and for removing the water portion of the mixture. The CVV or NVLD 26 may comprise a normally open solenoid controlled by the EEC 34 via an electrical connection to the CVV or NVLD 26.

A vapor management valve (VMV) 30 is coupled between the intake manifold 14 and a fuel tank 12 and the evaporation canister 16. The VMV 30 may comprise a normally closed vacuum operated solenoid which is also energized by the EEC 34. When the VMV 30 opens, the vacuum of the intake manifold 14 draws fuel vapor from the evaporation canister 16 for combustion in the cylinders of the engine 38. When the EEC 34 de-energizes the VMV 30, fuel vapors are stored in the evaporation canister 16. The system 10 may further include a service port 32 coupled between the VMV 30 and the fuel tank 12 and the evaporation canister 16.

In addition to controlling the CVV or NVLD 26 and VMV 30, the EEC 34 also controls a throttle plate 36 forming part of a throttle body (not shown) which in turn controls the flow of air into the intake manifold 14.

Figure 2A:
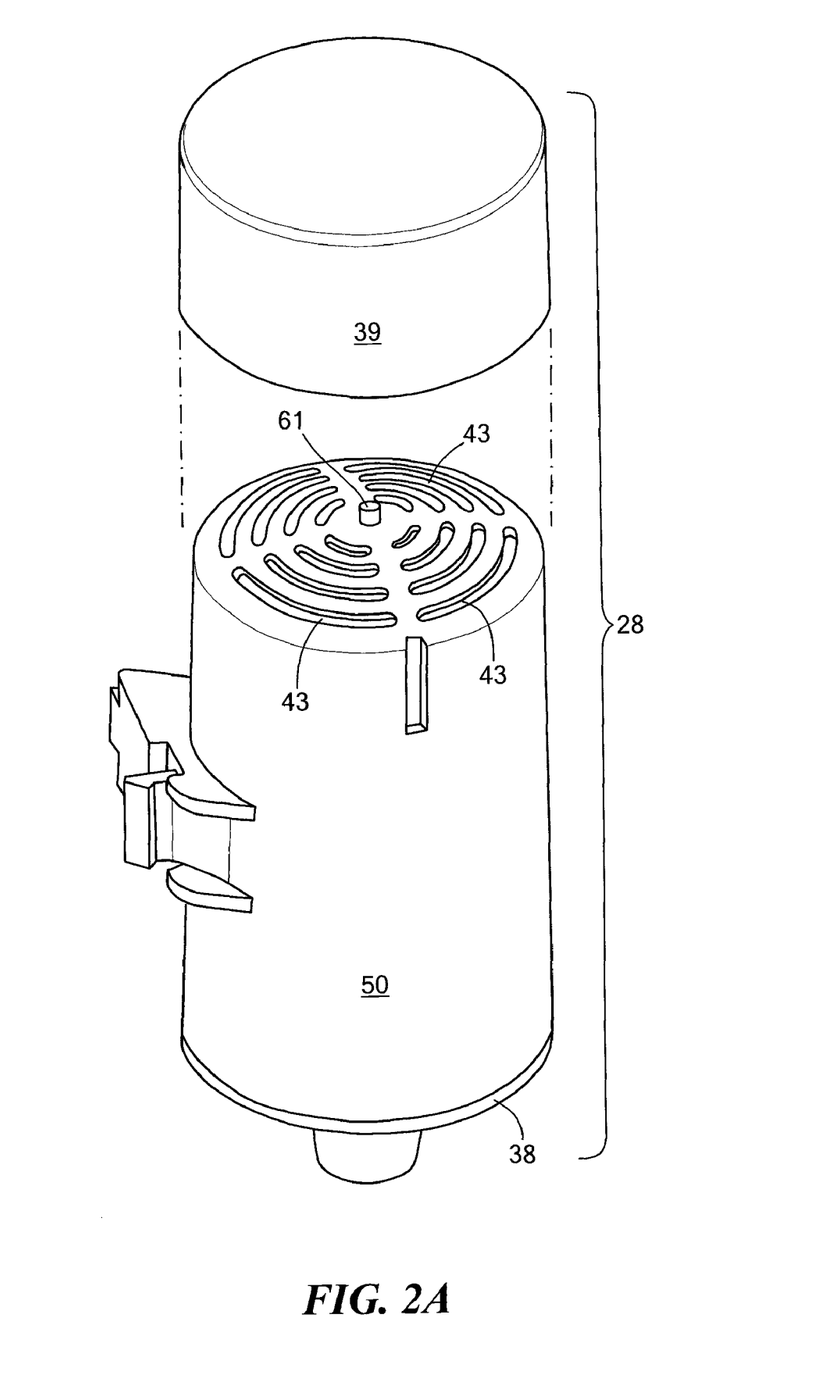
FIGS. 2A-2C are diagrams showing the filter assembly and cap thereof according to one embodiment of the disclosure.
Figure 2B:
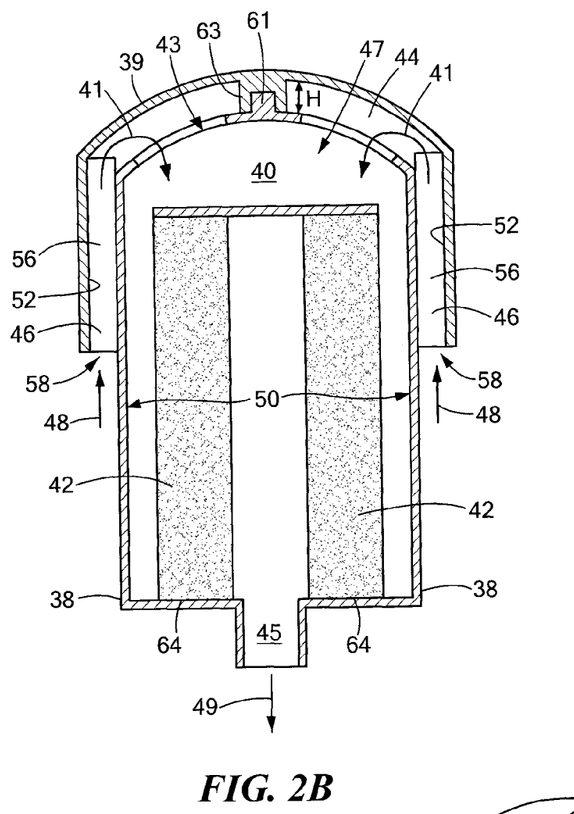
Figure 2C:
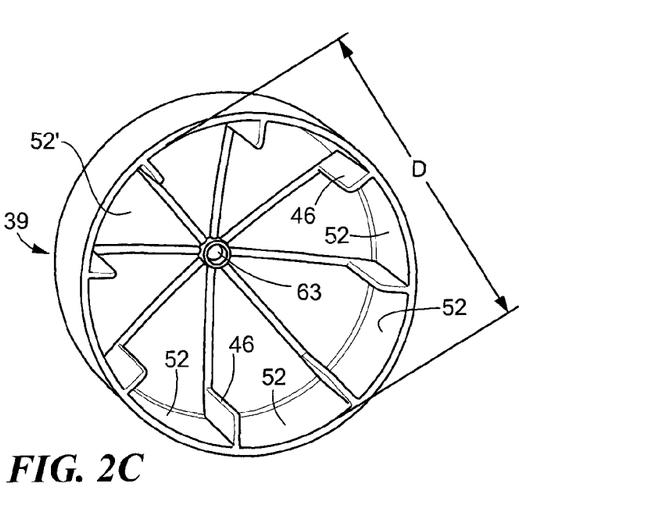
Figures 3A, 3B, 3C:
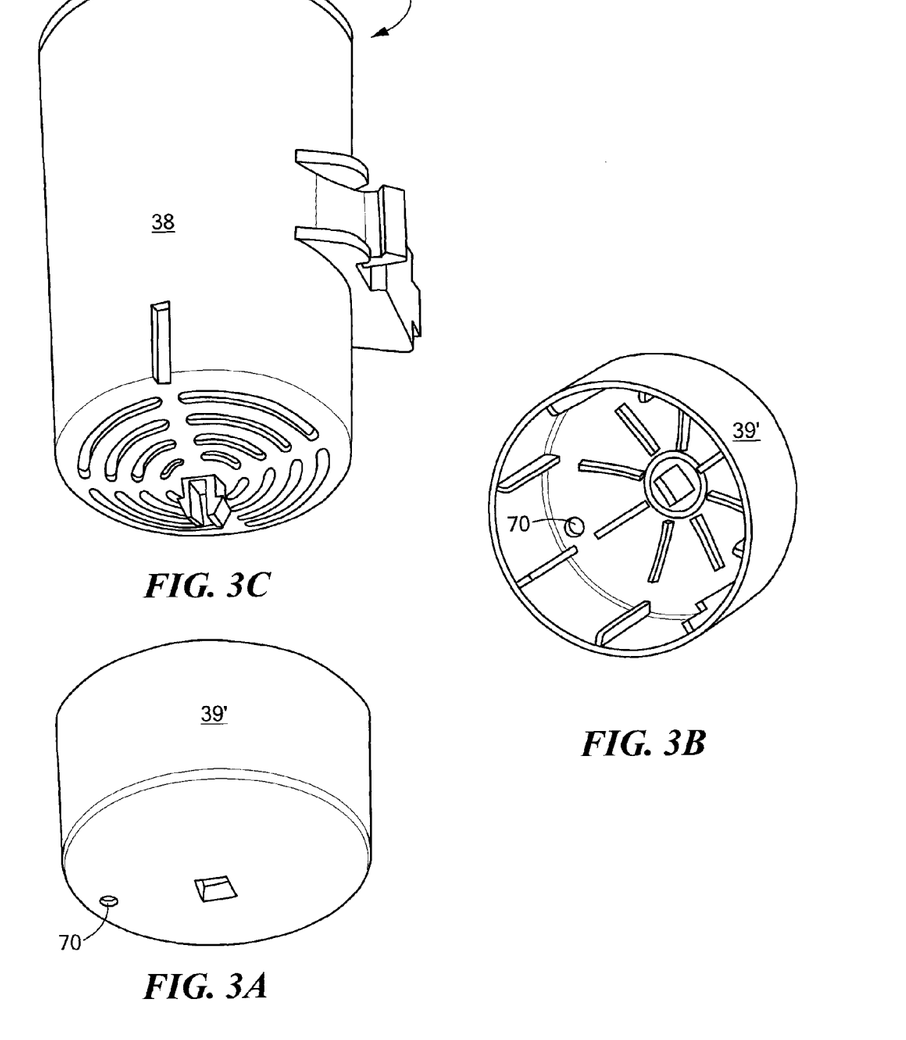
FIGS. 3A-3D are diagrams showing the filter assembly and cap thereof according to another embodiment of the disclosure.
Figure 3D:
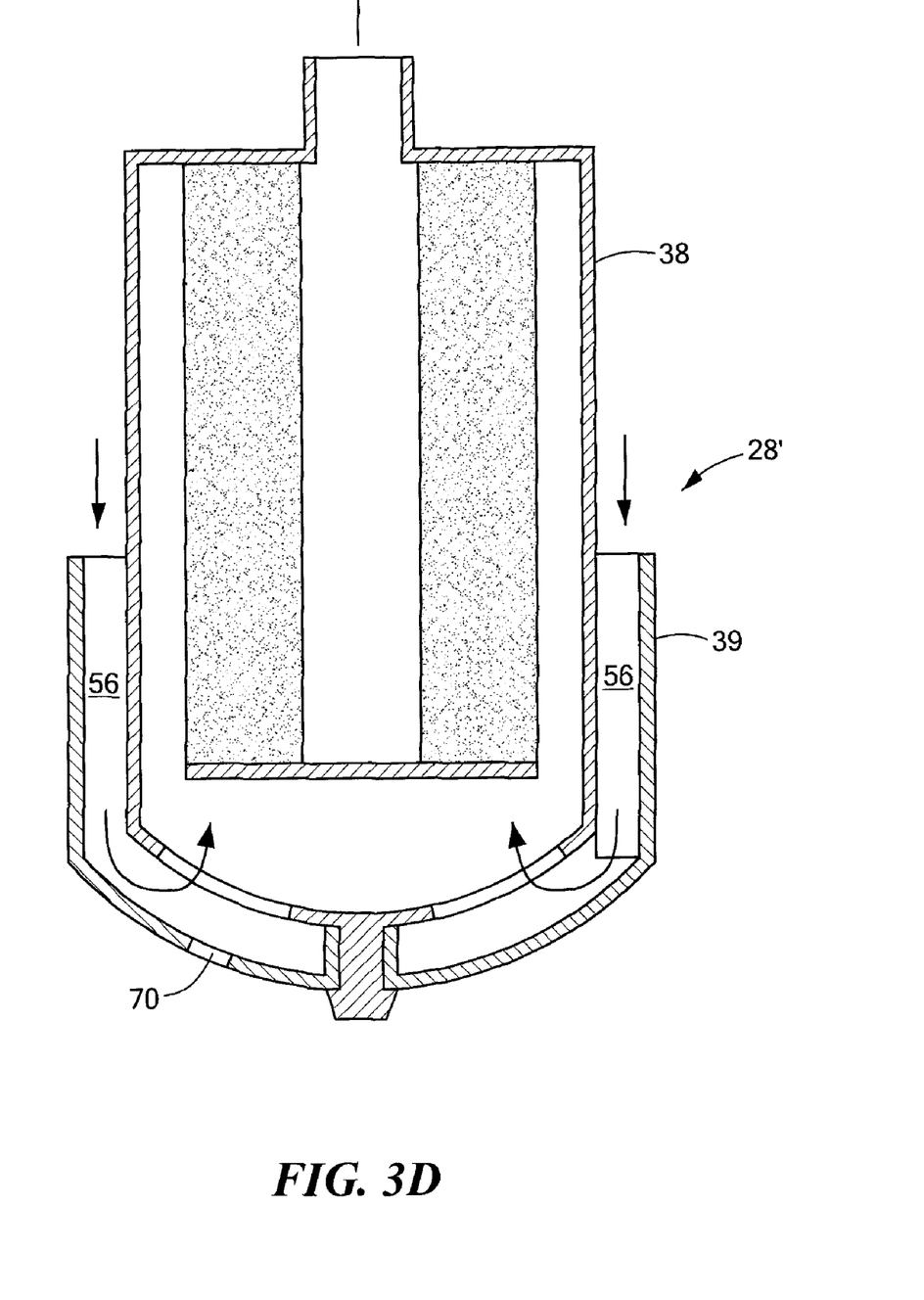

Referring now to FIGS. 2A, 2B and 2C, the filter assembly 28 (FIG. 2A) is shown to include: an air filter housing 38 and a cap 39 disposed on the top of the housing 38. The housing has a compartment 40 (FIG. 2B) having therein an air filter 42 (FIG. 2B). The top of the housing 38 has air holes 43 (FIGS. 2A and 2B) formed therein, such air holes 43 enabling air flow (indicated by arrows 41) to pass into the compartment 40, then through the air filter 42 and then exit the housing 38 through exit port 45.

The cap 39, shown more clearly in FIG. 2C, covering the air holes 43 has a plurality of ribs 46 formed along the inner peripheral sidewalls of the cap. When assembled with the housing 38 (more particularly when the cap 39 is disposed over the upper portion of the outer sidewalls 50 of the compartment 40 of the housing 38), the ribs 46, outer sidewalls 50 of the compartment 40, and inner sidewalls 52 of the cap 39 form a plurality of air flow channels 56 FIG. 2B, having inlets 58 for receiving a mixture of air and water mixture from the atmosphere, with the walls of the channels 56 (i.e., the inner walls 52 of the cap 39 and the outer sidewall 50 of the compartment 40) collecting droplets of a water portion of the mixture entering the channels 56, The collected water portion is removed from the filter assembly 28 by gravity (i.e., the water falls by gravity back through the inlets 58) while the air filter 42 in compartment 40 receives the air portion of the mixture exiting outlets of the channels through the air holes 43 in the top of the housing 38. As described above, the exiting air portion is received by the air filter in the compartment and passes through the air filter 42, and after passing through the air filter 42, it passes out of the filter assembly 28.

Still more particularly, typically there are 6 to 8 channels 56; here, there are 8 channels formed by the 8 ribs 46 shown in FIG. 2C. The ribs 46 (and hence the channels 56) are distributed evenly around the inner surface 52 of the cap 39. Here the ribs 46 are molded with the cap 39.

The width of each one of the channels 56 is here 4-5 mm and the length of each one of the channels 56 is here 20-28 mm. The separation of the water and air is based on an aerodynamic principle that makes use of the large difference between the density of the air and the density of the water. The following lists the conceptual fundamentals:

Applying the air/water gravity difference to separate water from the air.

Making narrow flow channel to guide the two-phase flow.

Utilizing centrifugal force effect—swirl, spiral, conical, etc., to be described.

Reducing air/water inlet area to limit containments entering the filter.

During the engine EVAP system purging process, the air/contaminants mixture stream 48 enters from the ring shaped entrance 58 (FIG. 2B). When the mixture passes the flow channels 56, the fluid flows in the axial direction toward the outlet of the channels 56. The exiting air in the mixture stream easily turns almost 180 degrees as shown by air stream 41 in FIG. 2B to enter the air holes 43 and enters the compartment 40; however, the water is left on the inner walls 52 (FIG. 2C) of the cap 39. As more and more water accumulates on the inner walls 52 (FIG. 2C) of the cap 39, it will slide on the inner walls of the cap and the flow channels 56, and eventually is drained out by gravity from the inlet 58 of the channels 56. Some of the fine solid dust particles may enter the compartment 40; however, the filter 42 media element with its fine mesh will block the dust particles on its surfaces. Eventually the clean air 49 drains out from the outlet 45 and flows to the canister 16 (FIG. 1). The entire system functions like a "two-stage" filtration system: The liquid water is filtered out from the first stage and the fine dust is filtered out in the second stage. Since the filter/cap assembly 28 is mounted in the head-up vertical position, the water and dust in the channels 56 are "self-cleaning".

The water accumulated in the inner surfaces 52 of the cap 39 smears on the inner walls of the flow guides (i.e. ribs 46) and the inner chamber portions 44 of the top of the cap 39. As more water is accumulated, the water drops down along the inner walls.

It is noted that a post 61 (FIGS. 2A, 2B) is formed at the top of the housing and that a hole 63 (FIG. 2C) is formed in the center of the inner surface of the cap 39 to receive the post 61. The inner diameter of the cap 39 is D. The height H of the chamber 44 and the diameter D are selected in order to guide the water to drain out; a suggested ratio of height/diameter (H/D) is in the range of $\frac{1}{10}$-$\frac{1}{7}$.

Referring now to FIG. 2A', a snap mechanism embodiment may be used to affix the cap 39 to the housing 38 is shown. Here, the cap 39 has a square hole 60 to receive a projecting snapper 62 formed on the top of housing 38. The functions of the snap mechanism (i.e., hole 60 and snapper 62) are: (1). To maintain a certain gap between the top inner surface 52' (FIG. 2C) of the cap 39 and the filter compartment 40 entrance grill (i.e., the air holes 43 (FIG. 2A)); (2). To fix the cap 39 position and angular orientation; and (3) To secure the cap 39 to the housing 38. The ring shaped water/air entrance (i.e., inlet 58 (FIG. 2B) is located at the bottom of cap. The inside of the filter compartment 40, includes a filter media element 42, and a flat bottom surface or base 64 to create a boundary. The filter media element 42 is mounted firmly on the filter base 64.

Referring now to FIGS. 3A-3D, an embodiment is shown of a filter assembly 28' where the filtered air must pass out from the assembly in an upward direction. Here the cap 39' has a drain hole 70 to enable gravity to drain the water portion out of the assembly 28' through the hole 70. Thus, here again, the droplets of the water are collected on the inner walls of the channels but here the collected droplets exit under the force of gravity through hole 70 rather than through the entrance of the channels.

Figure 4A:
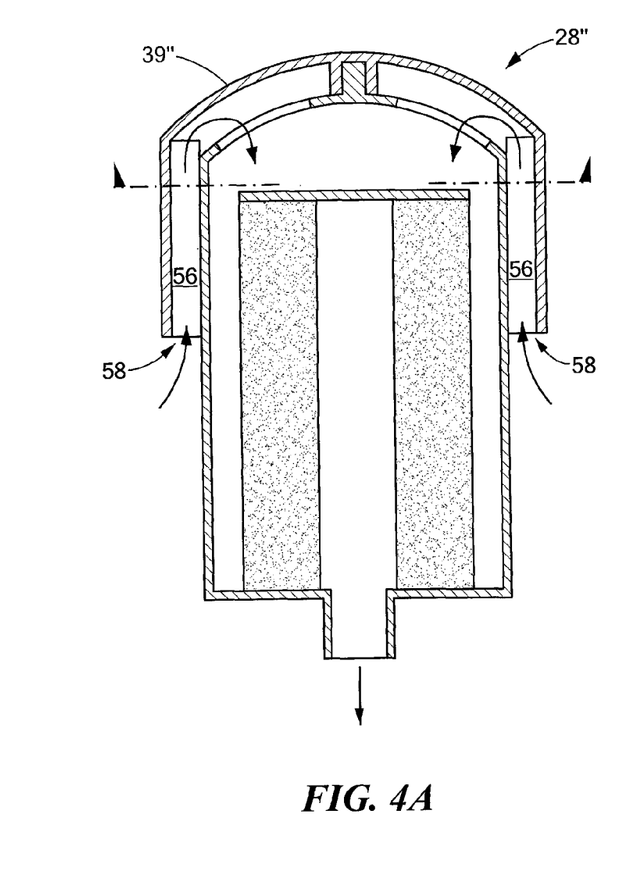
FIGS. 4A-4C are diagrams showing the filter assembly and cap thereof according to another embodiment of the disclosure.
Figure 4B:
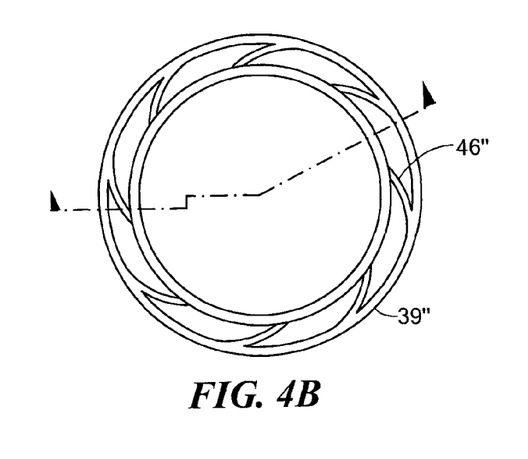
Figure 4C:
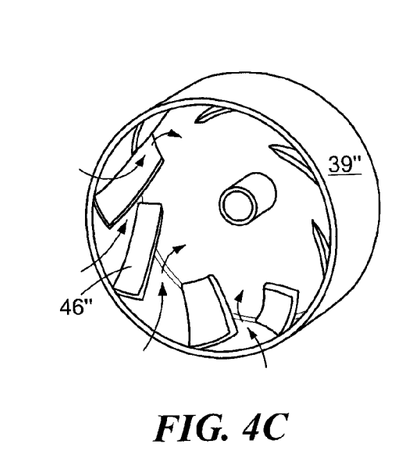

Referring now to FIGS. 4A-4C, here the structure 28" causes the incoming flow to swirl, inside of the fluid domain with the ribs 46" shaped like the turbine impeller blades, to create a swirling flow. The centrifugal forces acting on the water droplets cause them to move toward the inner walls of the cap 39". When the amount of accumulated water smeared on the walls becomes sufficient to flow, the water flows down and eventually drains out from the entrance 58 of the channels 56.

Figure 5A:
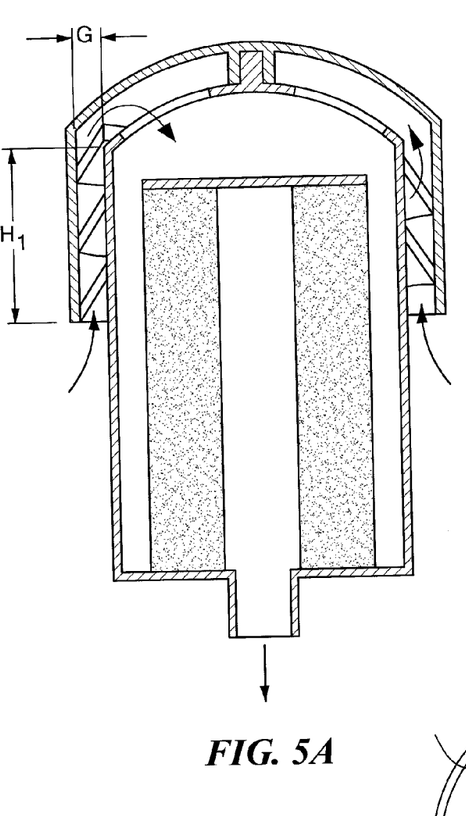
FIGS. 5A-5B are diagrams showing the filter assembly and cap thereof according to another embodiment of the disclosure.
Figure 5B:
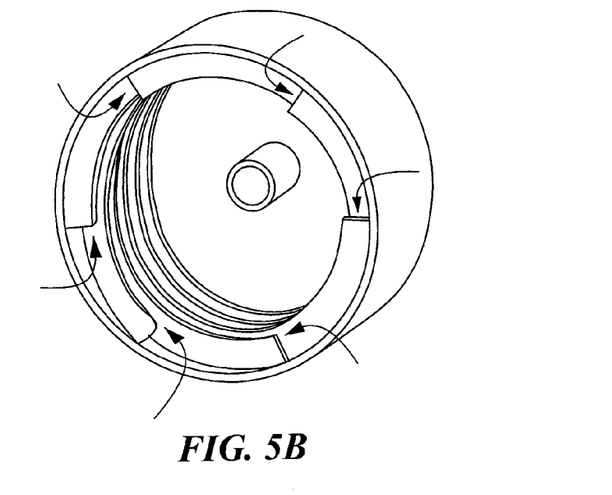

Referring now to FIGS. 5A and 5B, here is another embodiment, which is shown to cause swirl in the flow domain. Instead of the turbine impeller blades of FIGS. 4A-4C, here the embodiment uses spiral flow guides to generate swirl. The spiral flow guides may have up to 6 or 8 blades with $\frac{1}{2}$-$1\frac{1}{2}$ turns as shown. In this embodiment, the dimensions are critical: H1/G≧7, and G=3-4 mm are recommended to allow certain strength of the generated swirl.

Figure 6:
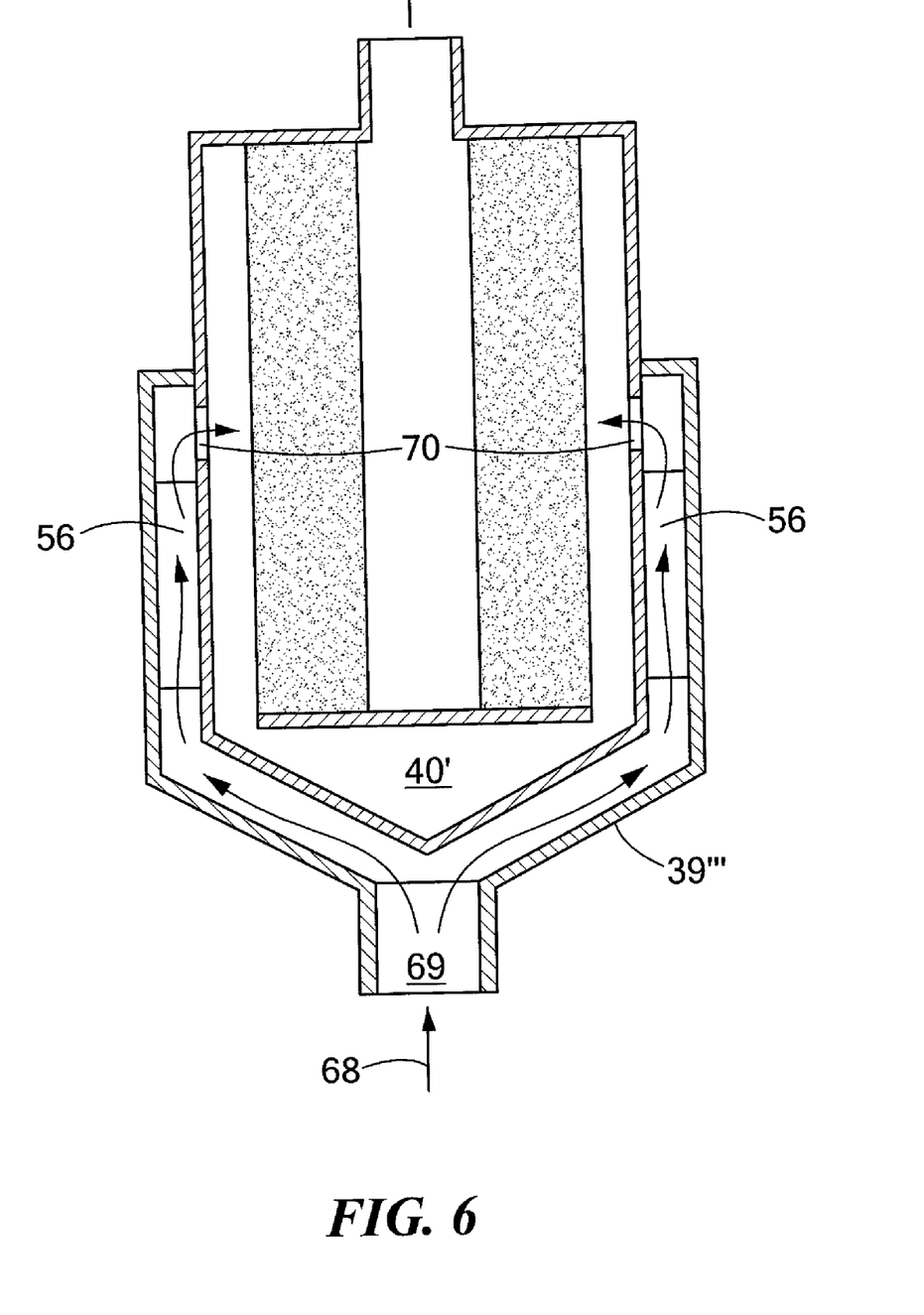
FIG. 6 is a diagram showing the filter assembly according to another embodiment of the disclosure.

Referring now to FIG. 6, in this embodiment, the water/air mixture 68 enters from the bottom entrance 69 of the cap 39''' and the flow passes through the channels 56. The channels 56 serve dual functions: as flow stream path guide, and also collection of the water drops smeared on their inner surfaces. The filter compartment 40' is modified to have side feeds 70 as shown. The airflow enters into the filter compartment 40' through 6-8 side feed entrances 70 with diameter in the range of 3.5-5 mm. However the water drains back along the inner walls of the channels 56 and exits through the entrance hole 69 in the cap 39''' by gravity. The channels 56 may be straight or spiral in shape as described above. It is noted that in this embodiment, smaller entrance areas that prevent contaminants from entering into the system are possible. The smaller entrances include both the cap entrance 69 and the filter compartment entrances 70.

Figure 7A:
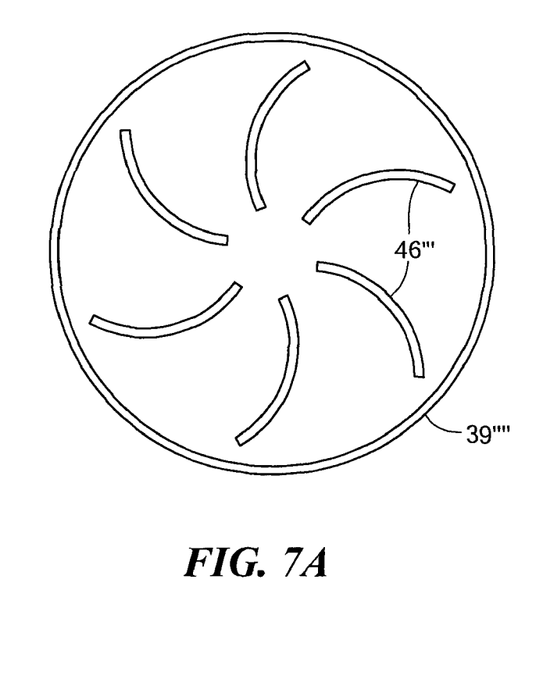
FIGS. 7A-7B are diagrams showing the filter assembly and cap thereof according to another embodiment of the disclosure.
Figure 7B:
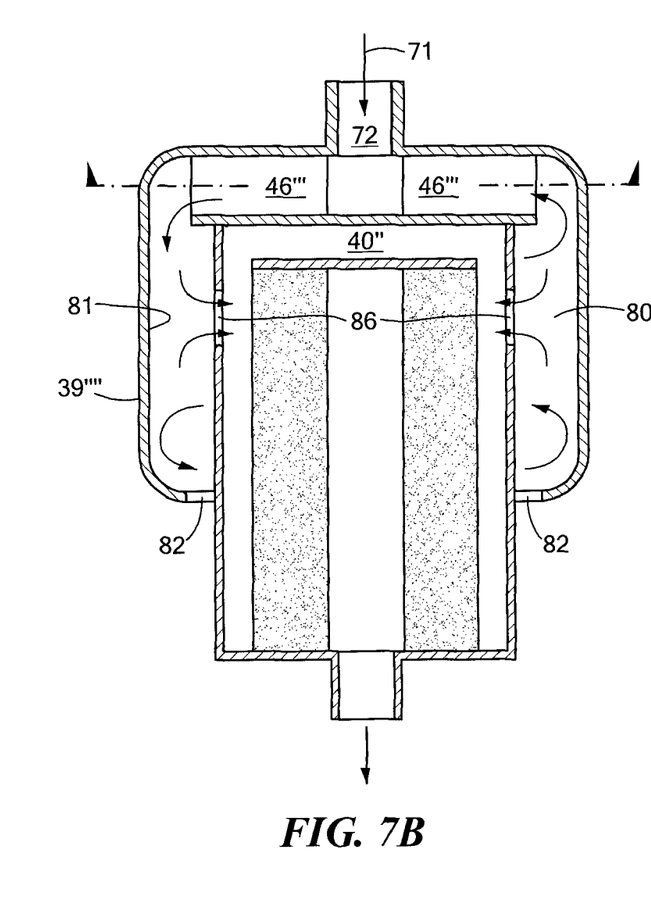

Referring now to FIGS. 7A and 7B, here, the water/air mixture 71 enters from the cap entrance 72, as shown. The water/air flow stream 71 comes into the turbine type blades 46''' formed in the cap 39'''', that create a swirling flow about the axis of the filter compartment 40" in the chamber 80. Because of the centrifugal force, water droplets are pushed to the periphery in the chamber 80 formed in the cap 39'''' and get smeared on the inner walls 81 of the cap 39''''. The water collected on the walls 81 leaves the cap 39'''' via drain holes 82 in cap 39''''. However, the air easily turns 90 degrees and enters into the filter compartment 40" through the entrance holes 86, on the periphery of the filter compartment wall.

Figure 8:
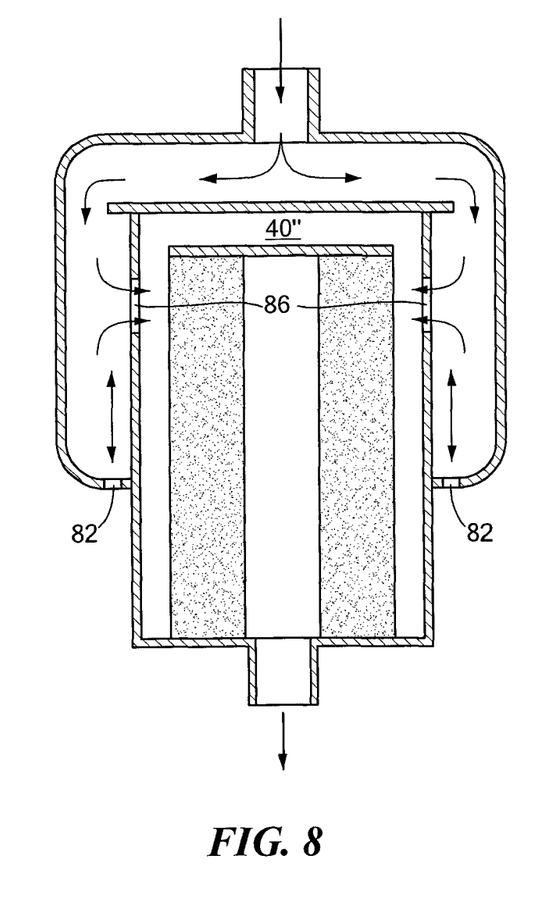
FIG. 8 is a diagram showing the filter assembly according to another embodiment of the disclosure.

If no turbine type blades are used, the system is reduced to a simpler configuration that is the embodiment shown in FIG. 8. When the EVAP purging flow rate is low, this configuration is good enough to separate water and air.

Figure 9:
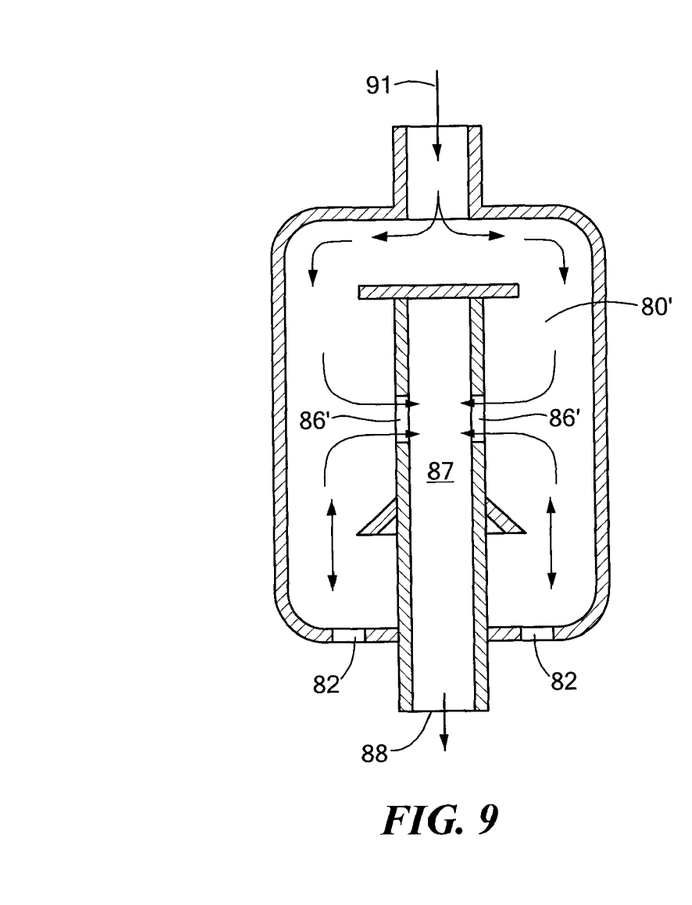
FIG. 9 is a diagram showing an air/water separator according to the disclosure.

Referring now to FIG. 9, for a tubular entrance typed EVAP filter, an independent water/air separator as shown in FIG. 9 may be used. FIG. 9 shows such a separator. Similar to the embodiment FIG. 8, the water/air mixture flowstream 91 enters the separator axially. Water droplets drop down in the chamber 80' and eventually drain out through the drain holes 82. The clean air comes in the center tube 87 through holes 86' and discharges through the outlet 88.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A water/air separator, comprising:
   at least one elongated channel having channel inlet for receiving mixture of air and water and for passing the mixture of air and water to a channel outlet with the walls of the channel collecting droplets of the water portion of the mixture and wherein the collected water is removed by gravity;
   an inner compartment having a separator outlet;
   an air filter;
   wherein the inner compartment has the air filter therein positioned to receive the air portion received from the channel outlet to filter the received air portion and wherein the separator outlet receives the filtered air portion of the mixture; and
   wherein an outer portion of the inner compartment provides an inner wall portion of the at least one channel.

2. A filter assembly, comprising:
   an air filter;
   an air filter compartment having the air filter disposed therein;
   a cap covering the air filter compartment, such cap having ribs disposed along inner sidewalls of the cap, such ribs, outer sidewalls of the compartment, and inner sidewalls of the cap forming a plurality of channels having inlets for receiving a mixture of air and water, with the walls of the channels collecting droplets of a water portion of the mixture entering the channels and wherein the collected water portion is removed from the filter assembly by gravity and wherein the air filter compartment receives the air portion of the mixture exiting outlets of the channels, such exiting air portion received by the compartment passing through the air filter, and after passing through the air filter, passing out of the filter assembly.

3. The filter assembly recited in claim 2 wherein the compartment includes an entrance grill for receiving the air portion of the mixture from the outlets of the channels and wherein the cap has a resilient snap member projecting outwardly therefrom and wherein the grill has a portion thereof formed to receive the snap member to enable the cap to be snapped to the grill.

4. The filter assembly recited in claim 3 wherein the cap has a hole for passing the water portion of the mixture being removed by gravity.

5. The filter assembly recited in claim 3 wherein the ribs are formed to provide the channels with a shape to produce a swirl-like flow in the mixture entering the channels.

6. The filter assembly recited in claim 3 wherein the ribs are formed to provide the channels with a shape to produce a spiral-like flow in the mixture entering the channels.

7. The filter assembly recited in claim 2 wherein the caps has a top portion and sidewalls extending from top, the sidewalls are parallel to sidewalls of the filter compartment.

8. A filter assembly, comprising:
an air filter;
an air filter compartment having the air filter disposed therein;
a cap covering the air filter compartment, such cap having ribs disposed along inner sidewalls of the cap, such ribs, outer sidewalls of the compartment, and inner sidewalls of the cap forming a plurality of channels having inlets for receiving a mixture of air and water, with the walls of the channels collecting droplets of a water portion of the mixture entering the channels and wherein the collected water portion is removed from the filter assembly by gravity and wherein the air filter compartment has holes through the sidewalls for receiving the air portion of the mixture exiting outlets of the channels, such exiting air portion received by the compartment passing through the air filter, and after passing through the air filter, passing out of the filter assembly.

9. The filter assembly recited in claim 8 wherein the caps has a top portion and sidewalls extending from top, the sidewalls are parallel to sidewalls of the filter compartment.

10. The filter assembly recited in claim 8 wherein the ribs are formed to provide the channels with a shape to provide a swirl-like stream to the mixture entering the channels.

11. The filter assembly recited in claim 8 wherein the ribs are formed to provide the channels with a shape to provide a swirl-like stream to the mixture entering the channels.

12. An internal combustion engine system, comprising:
an internal combustion engine having an intake manifold;
an evaporation canister;
wherein the intake manifold is coupled to the fuel tank and to a first port of the evaporation canister;
a filter assembly coupled between the atmosphere and a second port of the evaporation canister through an electronically controllable valve; such filter assembly comprising:
an air filter;
an air filter compartment having the air filter disposed therein;
a cap covering the air filter compartment, such cap having ribs disposed along inner sidewalls of the cap, such ribs, outer sidewalls of the compartment, and inner sidewalls of the cap forming a plurality of channels having inlets for receiving a mixture of air and water, with the walls of the channels collecting droplets of a water portion of the mixture entering the channels and wherein the collected water portion is removed from the filter assembly by gravity and wherein the air filter compartment receives the air portion of the mixture from exiting outlets of the channels, such exiting air portion received by the compartment passing through the air filter, and after passing through the air filter, passing out of the filter assembly.

13. The internal combustion engine recited in claim 12 wherein the caps has a top portion and sidewalls extending from top, the sidewalls are parallel to sidewalls of the filter compartment.

14. The internal combustion engine recited in claim 12 wherein the ribs are formed to provide the channels with a shape to provide a spiral-like stream to the mixture entering the channels.

15. The internal combustion engine recited in claim 12 wherein the ribs are formed to provide the channels with a shape to provide a spiral-like stream to the mixture entering the channels.

\* \* \* \* \*